United States Patent
Aharon

(10) Patent No.: US 11,650,125 B2
(45) Date of Patent: May 16, 2023

(54) STRUCTURED LIGHT MEASURING DEVICE

(71) Applicant: Oren Aharon, Haifa (IL)

(72) Inventor: Oren Aharon, Haifa (IL)

(73) Assignee: Oren Aharon, Haifa (IL)

( * ) Notice: Subject to any disclaimer, the term of this patent is extended or adjusted under 35 U.S.C. 154(b) by 80 days.

(21) Appl. No.: 17/368,860

(22) Filed: Jul. 7, 2021

(65) Prior Publication Data

US 2023/0011069 A1  Jan. 12, 2023

(51) Int. Cl.
  *G01M 11/02* (2006.01)
  *G01B 11/27* (2006.01)

(52) U.S. Cl.
  CPC ....... *G01M 11/0221* (2013.01); *G01B 11/272* (2013.01)

(58) Field of Classification Search
  CPC .................................................. G01B 11/272
  USPC ....................................................... 356/127
  See application file for complete search history.

(56) References Cited

U.S. PATENT DOCUMENTS

2003/0085335 A1* 5/2003 Almogy ............. G01N 21/9501
                                                   250/208.1

FOREIGN PATENT DOCUMENTS

CN        1815137 A  *  8/2006

* cited by examiner

*Primary Examiner* — Tarifur R Chowdhury
*Assistant Examiner* — Omar H Nixon

(57) ABSTRACT

A method and apparatus for a structured light measuring device, having a preferable VCSEL array in its previous illuminated cross plane, using the laser array to be projected through said device's objective and collect the reflected beams through the same objective lens. A motorized stage is attached to the objective focusing, enabling back and forth focusing on different external planes. A software algorithm running on a computer device will analyze the reflected laser beam and find its central point and further translate it to angular deviations, similar to Autocollimation principles. Furthermore, this could be displayed as a cross on the user GUI for better user interface. The focusing function has the capability to focus the laser array at various planes, and analyze if the reflected beam is at its best focal point or deviates. By moving the focal point back and forth, a 3-D reconstruction can be achieved, preferable for lenses and calculating the center location relative to the device's line of sight.

7 Claims, 5 Drawing Sheets

STRUCTURED LIGHT MEASURING DEVICE

BACKGROUND OF THE INVENTION

1. Field of Invention

Autocollimation concept has been a driving technology for optical solutions for over a decade. Electronic Autocollimators are a relative new technology, promising highly accurate reflected angular directions, usually from a mirror surface. Recent technologies enable measurements which were not an integral part of the Autocollimation concept, such as lateral measurement of mechanical deviations, as well as analyzing incoming laser beam divergence angles. However, some basic optical measurements are still challenging for traditional Autocollimators, such as 3-D measurements of broad lenses. Using those measurements for centration and extremely high projected intensity for measurements over large distances.

2. Description of the Related Art

The basic principle of Autocollimation was originally developed a century ago, and relies upon projecting an illuminated cross through a beam splitter and an objective lens, wherein the objective lens focuses the said cross to infinity. Seldom, a mirror is used to back reflect the image of the projected cross, which is further collected by same objective lens, this launching and collecting the cross by the same objective lens—hence the name of the Autocollimator. The back reflected cross is focused on an image plane, creating the image of the cross, which is observed by an eyepiece. Proceeding from optical Autocollimators to Electronic Autocollimators involves replacing the eyepiece with a camera—usually CCD, placed on the image plane. The acquired image by the CCD is further processed by computer means instead of human processing. The proposed new art will redesign this concept by using a multiple-sources laser beam, preferable VCSEL array or artificially produced array of miniature light dots. Combining these modern technologies with computing and focusing will enable this system to project the VCSEL image array to very long distances, enabling accurate alignment over large distances, as well as 3-D characterization of a reflecting surface by examining how much of each reflected dot is out of focus, and from that deducting what is the curvature of reflecting surface, as well as its concentricity in respect to the structured light measuring device's line of sight.

SUMMARY

The present invention provides a method and system for a high-resolution curvature determination of surfaces combined with the capability of projecting multiple laser beams to long distances and receiving information of angular deviations of illuminated surfaces. This is achieved by a revolutionary new method, implemented into the autocollimation concept. An embodiment of the present invention utilizes a VCSEL array with multiple miniature lasers arranged in columns and rows, and projected through a beam-splitter and an objective lens. By moving the objective lens, this laser array will focus at different distances according to the position of the objective lens. The back reflected array will be collected by the same objective lens, and imaged on a laser beam profiling system which will analyze the size of each beam. If the back reflection of the array is produced by a perfect planar surface, which is perpendicular to the optical axis of the system, the beam profiler will analyze each laser, and by moving the focus position will find the best focal distance from the reflecting surface. On the other hand, if the reflecting surface is oblique or curved, by moving the focal distance, each laser from said array will be best focused at various positions according to the surface attitude. The back reflected image will be analyzed by said laser beam profiling and find each laser's best position according to its beam size. A linear motor stage is used to move back and forth the objective lens to create different focusing distances on examined target. The laser beam profiler will constantly calculate the beam size of each laser and find the smallest beam size of each, and record the exact position of objective lens, thus correlating best focal point of each laser with the focusing position of objective lens. From said scanning, a propagation graph of each laser could be built, and the waist position will be well-defined, wherein the waist represents a focused area on the object. Since there are many lasers—400 or more, a reconstruction of a 3-D representation of scanned area is derived. This 3-D representation will be used to define the object or lens radius of curvature and how much it deviates from said structure light measuring device's line of sight. Embodiment of present invention could use laser arrays of different wavelengths as well as laser arrays with multiple wavelengths. This technology is applicable for 3-D reconstruction of curved surfaces, alignment, and long-range angle monitoring.

DETAILED DESCRIPTION OF THE DRAWINGS

Figure 1:
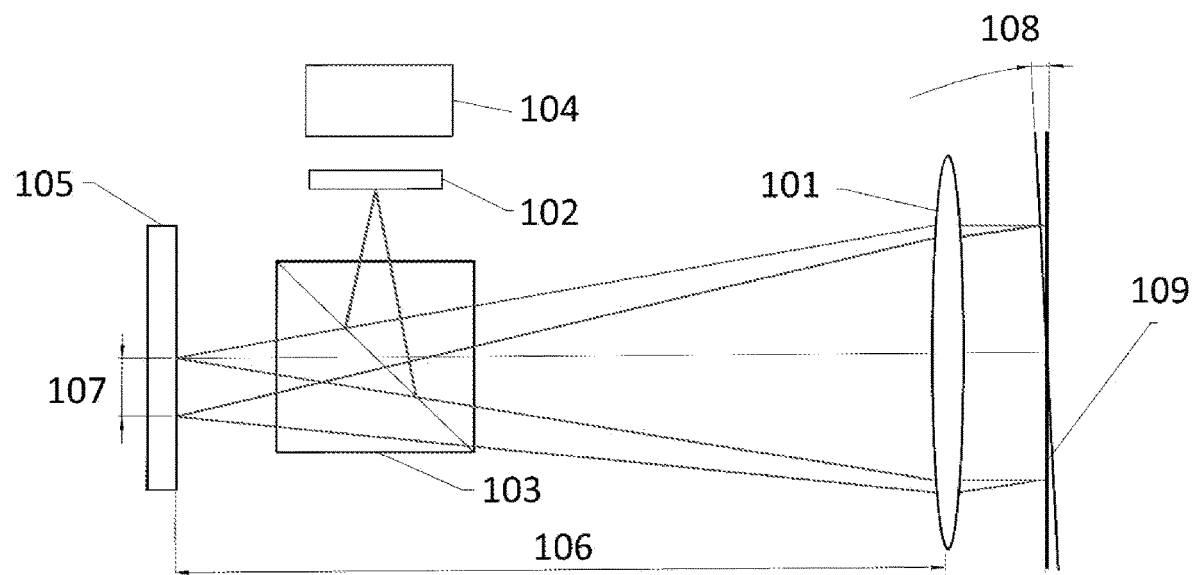
FIG. 1 is a schematic illustration of a classical Autocollimation layout.

The prior art of the classical autocollimation principle is based on a technology projecting an illuminated cross-like reticle through a beam splitter and an objective lens, said projected reticle is back reflected by a mirror and collected by same objective lens, thus creating the autocollimation effect and principle. The main objective of the autocollimation principle is to measure angular deviation of reflecting surfaces, and projecting as well as collecting the related light energy. The laws of physics dictate that a deviation of the mirror will cause a 2a deviation of reflected beam in respect to the incoming beam. This angular deviation, when collected by said objective, will cause a linear displacement on a built-in light sensitive sensor which is a direct function of the angular deviation and the focal length of said objective lens.

Usually, the objective lens is placed exactly one focal length away from detection surfaces, creating a situation where the angle measurement is independent of distance between reflecting mirror and objective lens. This prior art lacks the capability of 3-D measurements as well as being restricted in range because of limited light density created by the projected cross. It is the purpose of disclosed art is to offer a new technology capable of reconstructing 3-D figures of solid objects which are placed along the propagation axis as well as its deviation in respect to the center of optical axis.

Reference of prior art technology will be made in respect with FIG. 1, wherein the present disclosure will be made to embodiment examples which their illustrations will follow.

A light structure of present disclosure, preferable a vertical cavity surface-emitting laser (VCSEL) array configured to lase multiple emissions towards a beam splitter to output through a focusable objective lens, wherein back emissions from focused dots on surfaces are recollected by said objective lens and focused on a beam profiling camera-based device by moving the focal point using a stage parallel to the optical axis, it is possible to scan the propagation direction of the multiple laser beams. Using the beam profiling characteristics of the camera, a 3-D reconstruction of solid objects along the propagation axis is achieved. The focusing mechanism is based on a linear stage wherein each point along the stage stroke is calibrated to reflect a specific focusing distance of projected laser array. Such a device is very important for lens surface characterization as well as lens centering in respect to the Autocollimator optical axis. Said calibration is performed not only for distance, but also for lateral displacement at the focal plane of interest. This arrangement is very desirable not only for accurate measurement of angular deviation when the position of the lens is exactly one focal length from the detector, but for measuring devices at finite distance from the front of the measuring device. This is achieved relaying on the pre-calibration of both distance and lateral dimension as a function of linear stage position. A typical laser beam when focused, has a waist position which is relatively long due to lasers and optics theory. For finding best focal position, back and forth scanning is applied until a significantly larger beam in both sides of the waist position is achieved. By calculating the mid-point in between large and identical beam size, an accurate position of the focal point or the midpoint of the waist could be determined. To summarize, a structured light measuring device and method comprising of a vertical cavity surface-emitting laser (VCSEL) array device having a surface substantially parallel to a beam-splitter device and configured to direct emission of light through the top surface of beam-splitter; a beam-splitter device having a splitting surface to direct the laser VCSEL array emission towards an objective lens perpendicular to the direction of input VCSEL; an objective lens mounted on a linear stage capable of focusing the projected laser beams to various distances and collecting the incoming radiation from surfaces reflecting across the propagation direction, and further focusing said beams on a parallel (to lens) laser beam profiler; a laser beam profiler to analyze the propagation of each projected as a function of linear stage; and one or more processors to control said stage movement and perform a laser beam processing as generated by camera beam profiler, and use memories which contain pre-calibrated data to reconstruct the deviation of angles and 3-D forms disposed along the measuring device propagation axis.

Yet another embodiment having a light structure including a VCSEL and an RGB ring light illumination around said VCSEL. The RGB light illumination will be projected on a cross reticle, a reticle which is transparent or has a hole, preferable on its center, to allow the VCSEL illumination to penetrate through. This arrangement is a hybrid type of the structured light measuring device, allowing activation of system as a cross type autocollimator on top of the structured light feature.

Examples of embodiments are illustrated by the accompanied drawings. Said drawings will be described, including specific details and facilitating the understanding of embodiments. However, it is apparent to one of ordinary skill in the art, the various descriptions could be implemented without the specific details.

The used terminology for specific embodiments is used for better understanding and is not intended to limit the described art.

FIG. 1 illustrates a schematic layout of prior art autocollimation, wherein an objective lens 101 is placed exactly one focal length 106 from a camera sensor 105. A beam-splitter 103 is mounted in between said camera sensor and objective lens. Cross reticle 102 is mounted in such a way that it has exactly the same distance from said objective lens as said camera sensor. A light source 104 passing through said cross reticle projects the cross through the optical beam-splitter 103 and the objective lens to infinity. Reflective surface 109 back reflects the projected cross to the same objective lens which further focuses the beam on to said camera sensor. A small deviation 108 of said reflective surface will cause the focal point of reflected beam to offset by a certain amount 107. The deflected mirror angle 108 further denoted as a equals to the deviation 107 and denoted x, divided by twice the focal length f originally denoted as 106

$$a = x/2f.$$

Figure 2:
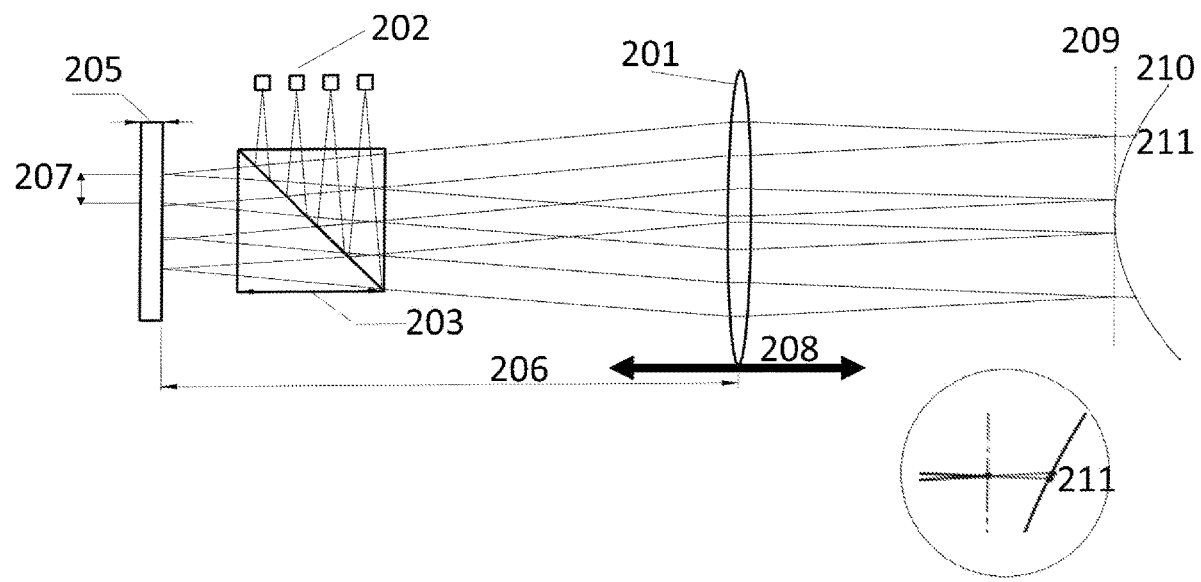
FIG. 2 is a schematic of the proposed system, wherein VCSEL are incorporated.

FIG. 2 is an illustration in accordance with current innovation and art, displaying the system which includes a preferable VCSEL array to create multiple light sources to be projected towards an area of interest, a calibrated focusing device moving the lens wherein each step has an entangled calibrated distance. The back reflected information is received by a camera beam profiler, analyzing the profile as a function of said focusing device. With reference to FIG. 2, an objective lens 201 is mounted on a linear stage 208, wherein linear movement of said lens will focus the system at different distances. An array of light sources, preferable VCSEL, denoted as 202 project their light beams towards a beam-splitter 203, focused by objective lens at a distance ahead according to the position of the lens 206 as dictated by the linear stage. The beams will focus at a plane denoted as 209. A spherically curved plane denoted as 210, and placed along the propagation axis will cause some of the beams to further spread from the original focused point and create on its surface a larger footprint denoted as 211. By moving the said objective lens using the linear stage, plane 209 will scan along the curvature and will create different imaging footprints on laser beam profiling camera denoted as 205. The distance between the beams on detector surface denoted as 207 represents the lateral distance on the curved plane and could be defined by the pre-calibrated data stored into the instrument's memory. A special configuration where the linear stage places the said objective lens exactly one focal length away from said VCSEL, the dots will be projected to infinity, and any back reflecting surface on their trajectory will cause the returned beams to be focused on beam profiling camera and the angular deviation of returned beams could be reconstructed. One or more processors (not shown) will control the stage movement as well as the laser beam processing as generated by a camera beam profiler.

Memories such as DRAM, SRAM, DDR RAM and other, will store in a non-volatile memory the calibrated data to later be used for accurate measurements based on sensor information and pre-recorded calibration data. Electronic display, preferable a part of the processing devices (like laptop) will display images to users and results in accordance with raw data and calculated measurements. The light emissions of VCSEL devices are configured to be attenuated according to system needs by current reduction or by pulsed width modulation of the current in such a way that the average power is significantly reduced.

Figure 3:
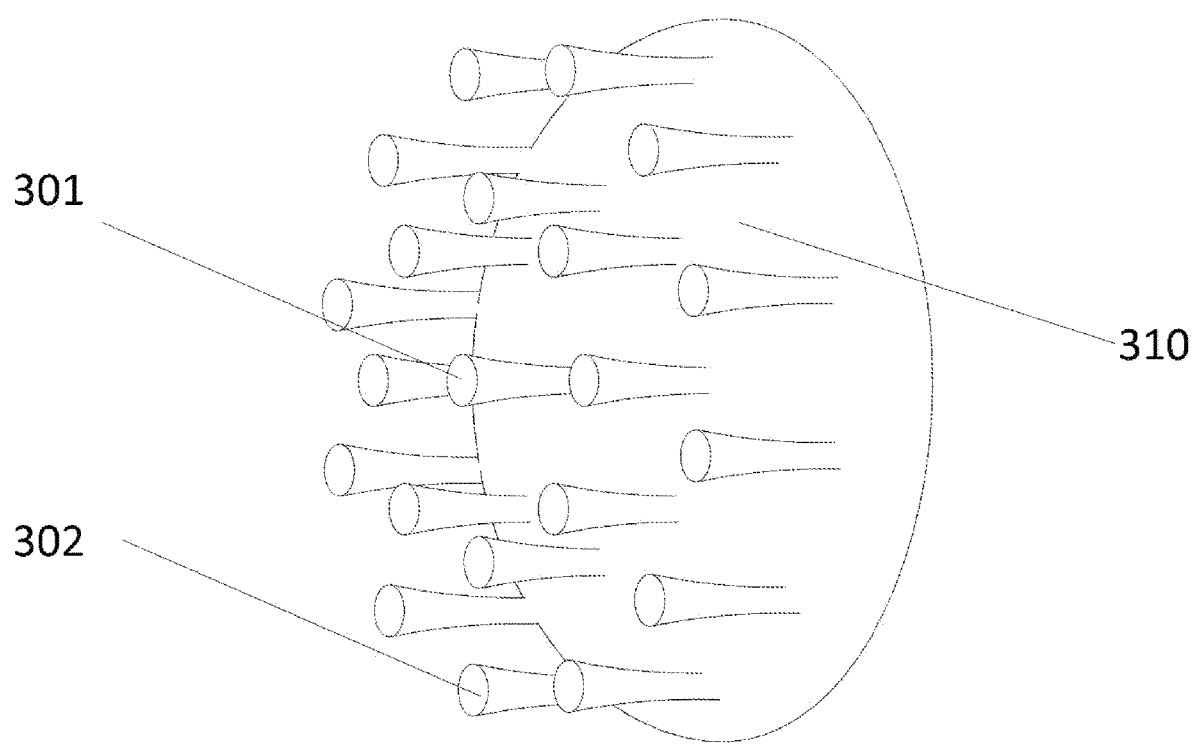
FIG. 3 is a typical schematic drawing showing multiple lasers, focusing on a lens curved surface.

FIG. 3 is an isometric view of the spherically curved plane used as a target with the corresponding focusing laser beams on its surface. Said focused laser beams are the image of the VCSEL on the said curved surface. The curved surface denoted as 310 will back reflect a diffused image of the footprint of laser beam on its surface. Keeping in mind that the objective lens is scanned along the curvature, each laser will have its minimum footprint in a different location according to the curvature. By building the reflected beam image as a function of scanned distance, it's possible to find the minimum of each footprint and deduct what is the scanned curvature. For example, 301 will have minimum footprint ahead of 302 and the distance in between, combined with lateral offset will define the curved target. Since the waist has no significant size change along a large distance, the best way to find its exact position is to build each beam propagation close to the focal point, find two similar size footprints before and after the focus point, and by selecting the midpoint in between, an accurate focal position could be determined.

Figure 4:
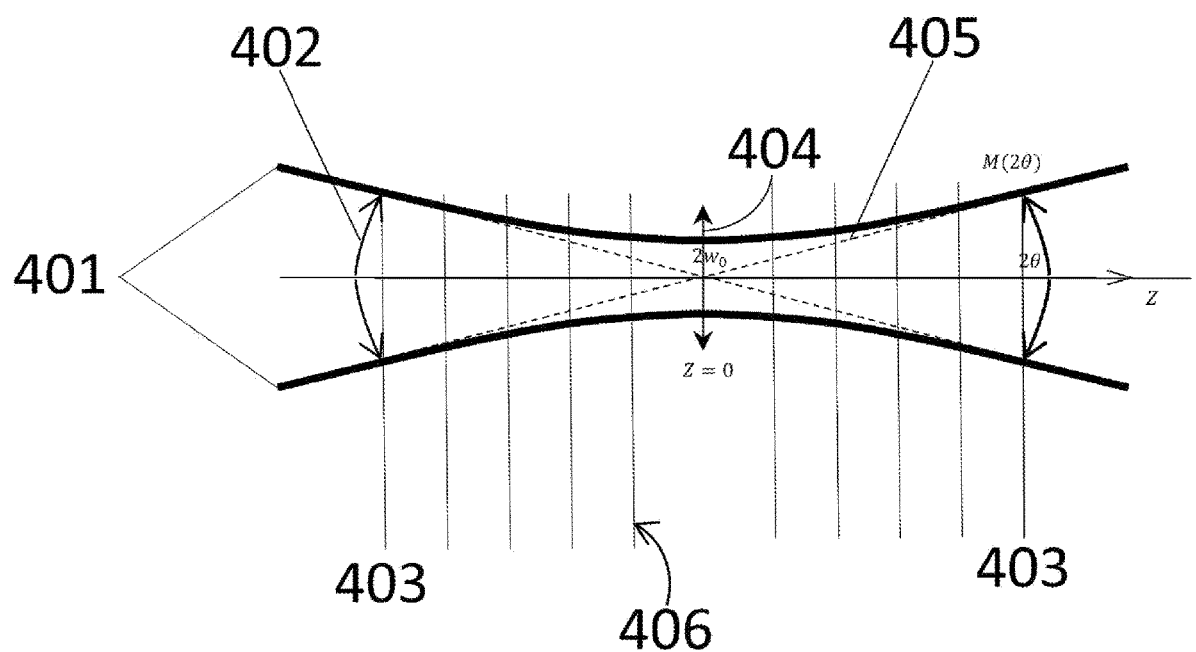
FIG. 4 is a schematic illustration of a reconstructed cross-section demonstrating typical propagation behavior of a laser reflection from a scanned surface.

FIG. 4 illustrates a reconstructed beam on detector surface as the focal point is moved across a curved surface, similar to the curved surface depicted in FIG. 3. This illustration is typical to all sources of VCSEL, for better understanding purposes only one is reconstructed. If multiple profiles are taken from reflected beam as a function of focus movement across the target, then a reconstruction propagation chart 401 is displayed. The divergence angle of said reconstructed chart is given by 402, and various positions are given by multiple parallel lines and are denoted as 406. The waist position is denoted as 404, and coincides with best focus on said target. Because the waist is relatively shallow as a function of movement, for calculation purposes two identical beam sizes 403 on opposite sides in respect to the waist are acquired. By using two asymptotic lines to propagation profiles and denoted as 405, then the waist position is calculated with great accuracy. By building this propagation curve for each of illuminating laser points on the curved surface, one can reconstruct the curvature by finding the position on the curved surface and its location along the propagation axis of each laser. The difference between the various waist position will yield a reconstructed 3-D surface.

Figure 5:
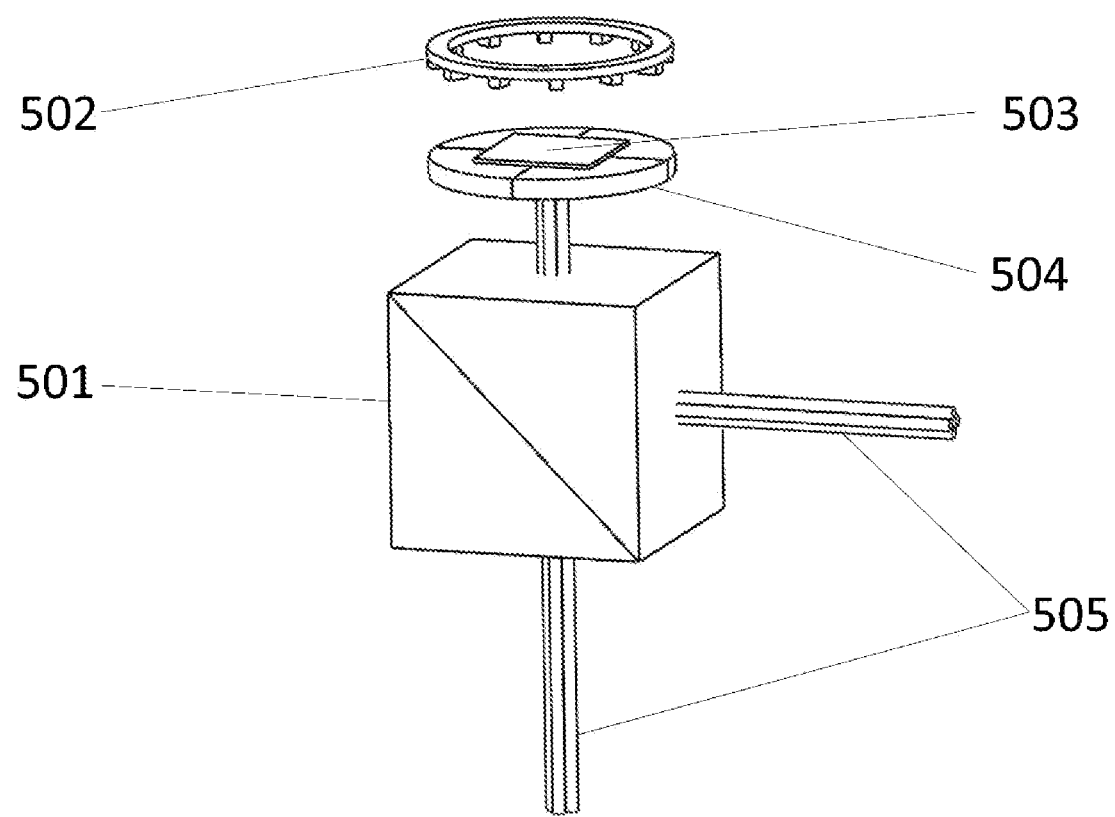
FIG. 5 is schematic illustration of a hybrid type of a structured light measuring device.

FIG. 5 illustrates the hybrid illumination concept wherein a ring LED light 502 illuminates a cross-like reticle 504, which is transparent or hollow in its central section, to allow a preferable VCSEL 503 to unobstructedly lase towards the beam-splitter 501, to split the beam into two perpendicular beams 505. Said microcontroller devices can control the illumination pattern by turning on the illumination ring which will generate a projected cross towards the objective lens, and the result will be very similar to an electronic autocollimator. Alternatively, the structured light produced by said VCSEL could be turned on (ring turned off). For special cases, both can be turned on. This arrangement increases the usability of the system, offering a structured light measuring device with built-in autocollimator-like behavior.

The invention claimed is:

1. A structured light measuring device, comprising:
a vertical cavity surface-emitting laser (VCSEL) array device having a surface substantially parallel to a beam-splitter device and configured to direct emission of light through the top surface of beam-splitter;
a beam-splitter device having a splitting surface to direct the laser VCSEL array emission towards an objective lens perpendicular to the direction of input VCSEL;
an objective lens mounted on a linear stage capable of focusing the projected laser beams to various distances and collecting the incoming radiation from surfaces reflecting across the propagation direction, and further focusing said beams on a parallel (to lens) laser beam profiler;
a laser beam profiler to analyze the propagation of each projected as a function of linear stage; and
one or more processors to control said stage movement and perform a laser beam processing as generated by camera beam profiler, and use memories which contain pre-calibrated data to reconstruct the deviation of angles and 3-D forms disposed along the measuring device propagation axis.

2. A structured light measuring device according to claim 1, where the projecting array comprises of multiple light sources emitted from one surface.

3. A structured light measuring device according to claim 1, where the VCSEL array has different wavelengths according to industry standards.

4. A structured light measuring device according to claim 1, where the VCSEL array is projected to infinity by placing said linear stage to create exactly one focal length between beam profiler and lens, thus capable of measuring angular variations from reflective mirror light surfaces.

5. A hybrid structured light measuring device with built-in reticle, comprising:
a vertical cavity surface-emitting laser (VCSEL) array device having a surface substantially parallel to a beam-splitter device and configured to direct emission of light through the top surface of beam-splitter;
an illuminated cross-like reticle substantially parallel to the beam-splitter with a hollow or transparent central region and configured to direct emission of penetrating light through its cross towards the beam-splitter surface;
a beam-splitter device having a splitting surface to direct the laser VCSEL array emission towards an objective lens perpendicular to the direction of input VCSEL;
an objective lens mounted on a linear stage capable of focusing the projected laser beams to various distances and collecting the incoming radiation from surfaces reflecting across the propagation direction, and further focusing said beams on a parallel (to lens) laser beam profiler;
a laser beam profiler to analyze the propagation of each projected as a function of linear stage; and
one or more processors to control said stage movement and perform a laser beam processing as generated by camera beam profiler, and use memories which contain pre-calibrated data to reconstruct the deviation of angles and 3-D forms disposed along the measuring device propagation axis.

6. A method of making a structured light measuring device, comprising:
a vertical cavity surface-emitting laser (VCSEL) array device having a surface substantially parallel to a beam-splitter device and configured to direct emission of light through the top surface of beam-splitter;
a beam-splitter device having a splitting surface to direct the laser VCSEL array emission towards an objective lens perpendicular to the direction of input VCSEL;

an objective lens mounted on a linear stage capable of focusing the projected laser beams to various distances and collecting the incoming radiation from surfaces reflecting across the propagation direction, and further focusing said beams on a parallel (to lens) laser beam profiler;

a laser beam profiler to analyze the propagation of each projected as a function of linear stage; and one or more processors to control said stage movement and perform a laser beam processing as generated by camera beam profiler, and use memories which contain pre-calibrated data to reconstruct the deviation of angles and 3-D forms disposed along the measuring device propagation axis.

7. A method of making a hybrid structured light measuring device with built-in reticle, comprising:

a vertical cavity surface-emitting laser (VCSEL) array device having a surface substantially parallel to a beam-splitter device and configured to direct emission of light through the top surface of beam-splitter;

an illuminated cross-like reticle substantially parallel to the beam-splitter with a hollow or transparent central region and configured to direct emission of penetrating light through its cross towards the beam-splitter surface;

a beam-splitter device having a splitting surface to direct the laser VCSEL array emission towards an objective lens perpendicular to the direction of input VCSEL;

an objective lens mounted on a linear stage capable of focusing the projected laser beams to various distances and collecting the incoming radiation from surfaces reflecting across the propagation direction, and further focusing said beams on a parallel (to lens) laser beam profiler;

a laser beam profiler to analyze the propagation of each projected as a function of linear stage; and one or more processors to control said stage movement and perform a laser beam processing as generated by camera beam profiler, and use memories which contain pre-calibrated data to reconstruct the deviation of angles and 3-D forms disposed along the measuring device propagation axis.

\* \* \* \* \*